(12) United States Patent
Poess et al.

(10) Patent No.: US 11,442,873 B2
(45) Date of Patent: Sep. 13, 2022

(54) MICROKERNEL ARCHITECTURE WITH ENHANCED RELIABILITY AND SECURITY

(71) Applicant: Meta Platforms Technologies, LLC, Menlo Park, CA (US)

(72) Inventors: Bernhard Poess, Redmond, WA (US); Mark Lucovsky, Kirkland, WA (US); Vadim Victor Spivak, Redwood City, CA (US); Christoph Klee, Snoqualmie, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/563,666

(22) Filed: Sep. 6, 2019

(65) Prior Publication Data

US 2021/0073147 A1 Mar. 11, 2021

(51) Int. Cl.
*G06F 13/10* (2006.01)
*G06F 9/54* (2006.01)
*G06F 9/50* (2006.01)
*G06F 13/38* (2006.01)

(52) U.S. Cl.
CPC .......... *G06F 13/102* (2013.01); *G06F 9/5005* (2013.01); *G06F 9/541* (2013.01); *G06F 9/545* (2013.01); *G06F 13/382* (2013.01); *G06F 2213/0026* (2013.01); *G06F 2213/3812* (2013.01)

(58) Field of Classification Search
None
See application file for complete search history.

(56) References Cited

U.S. PATENT DOCUMENTS

| | | | | |
|---|---|---|---|---|
| 5,771,383 | A * | 6/1998 | Magee | G06F 9/544 718/100 |
| 7,448,049 | B1 * | 11/2008 | Xing | G06F 9/54 709/200 |
| 8,271,995 | B1 * | 9/2012 | Papakipos | G06F 21/51 719/310 |
| 10,108,446 | B1 * | 10/2018 | Steinberg | G06F 9/44521 |
| 2003/0014521 | A1 * | 1/2003 | Elson | G06F 9/5011 709/225 |
| 2004/0255048 | A1 * | 12/2004 | Lev Ran | G06F 16/9574 709/249 |

(Continued)

*Primary Examiner* — Charles E Anya
(74) *Attorney, Agent, or Firm* — Baker Botts L.L.P.

(57) ABSTRACT

In one embodiment, a microkernel of an operating system executing on a computing system receives, from an application, a first system call requesting to communicate with a service registry. The first system call being associated with an operation request. The microkernel sends a first instruction to the service registry. The microkernel receives, from the service registry, a second system call requesting to communicate with at least one of an application service or a protocol service. The second system call being associated with the operation request. The microkernel sends a second instruction to at least one of the application service or the protocol service. The microkernel receives, from at least one of the application service or the protocol service, a third system call requesting to communicate with a driver service. The third system call being associated with the operation request. The microkernel sends a third instruction to the driver service.

18 Claims, 6 Drawing Sheets

(56) References Cited

U.S. PATENT DOCUMENTS

| | | | |
|---|---|---|---|
| 2005/0114870 A1* | 5/2005 | Song | G06F 21/52 |
| | | | 719/328 |
| 2006/0130060 A1* | 6/2006 | Anderson | G06F 9/45533 |
| | | | 718/1 |
| 2007/0156729 A1* | 7/2007 | Shaylor | G06F 5/065 |
| 2007/0288941 A1* | 12/2007 | Dunshea | G06F 9/5077 |
| | | | 719/328 |
| 2008/0147755 A1* | 6/2008 | Chapman | G06F 11/1466 |
| 2012/0017213 A1* | 1/2012 | Hunt | G06F 21/53 |
| | | | 718/100 |
| 2015/0040181 A1* | 2/2015 | Cook | G06F 21/6281 |
| | | | 726/1 |
| 2016/0162264 A1* | 6/2016 | Wong | G06F 9/44521 |
| | | | 717/114 |
| 2017/0315827 A1* | 11/2017 | Patil | G06F 9/44505 |
| 2019/0080102 A1* | 3/2019 | Teal | G06F 21/55 |
| 2019/0087431 A1* | 3/2019 | Qiu | G06F 16/16 |
| 2019/0251294 A1* | 8/2019 | Goodridge | G06F 21/604 |
| 2019/0253367 A1* | 8/2019 | Jaisinghani | H04L 47/829 |
| 2019/0370049 A1* | 12/2019 | Gopalan | G06F 9/45558 |

* cited by examiner

MICROKERNEL ARCHITECTURE WITH ENHANCED RELIABILITY AND SECURITY

TECHNICAL FIELD

This disclosure generally relates to microkernels used in an operating system.

BACKGROUND

In computer science, a microkernel is the near-minimum amount of software that can provide the mechanisms needed to implement an operating system (OS) These mechanisms include low-level address space management, thread management, and inter-process communication (IPC). If the hardware provides multiple rings or processor modes, the microkernel may be the only software executing at the most privileged level, which generally referred to as supervisor or kernel mode. In terms of the source code size, microkernels are often smaller than monolithic kernels.

SUMMARY OF PARTICULAR EMBODIMENTS

Disclosed herein is an operating system environment that comprises a microkernel with services separated out into various privilege levels. In particular embodiments, the microkernel may facilitate communication between the services between the various privilege levels. There are an increasing amount of people using augmented reality (AR) and virtual reality (VR) devices. Since these devices are designed to be constantly worn and covering the user's vision, there is a heightened need for security, privacy, and reliability. For instance, to ensure that an attacker may not access the camera service while the user is using the AR device. One goal of the disclosed methods may be to improve upon the reliability and security of the operating system due to the services being isolated from each other. To limit the scope of an attack in the example architecture, it may be necessary to further isolate services at a more granular level. To do so, services may be separated out into different levels on top of the micro-kernel. All of these may be isolated processes that can only communicate with each other with the help of the micro-kernel. Thus, even if a particular service has been compromised, the damage would not extend beyond that. Thereby, improving upon the security with this architecture.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

There are an increasing amount of people using augmented reality (AR) and virtual reality (VR) devices. Since these devices are designed to be constantly worn and covering the user's vision, there is a heightened need for security, privacy, and reliability. For instance, to ensure that an attacker may not access the camera service while the user is using the AR device. In conventional monolithic operating systems where all services reside within the kernel, once an attacker gains access to one service, it could have an attack vector that spans all other services within the kernel space. Existing micro-kernel designs that isolate certain services, such as the file system stack, help limit the scope of vulnerability, but the scope is still too large (e.g., a file system stack could include the file system, the underlying volume service, and the underlying driver block). While micro-kernel designs may impact the performance compared to a monolithic kernel, the micro-kernel design improves upon the reliability and security of the operating system due to the services being isolated from each other.

In particular embodiments, to limit the scope of an attack in the example architecture, it may be necessary to further isolate services at a more granular level. To do so, services may be separated out into different levels on top of the micro-kernel. As an example, on top of the micro-kernel, there may be a level of privileged services (e.g., service registry, launcher, loader, etc.), driver services (e.g., driver block, USB, PCI), protocol services (e.g., volume services, network services, etc.), application services (e.g., K/V store, event service, etc.), and applications. All of these may be isolated processes that can only communicate with each other with the help of the micro-kernel. Thus, even if a particular service has been compromised (e.g., the file system), the damage would not extend beyond that (e.g., the underlying volume service will not automatically be compromised). Thereby, improving upon the security with this architecture.

Figure 1:
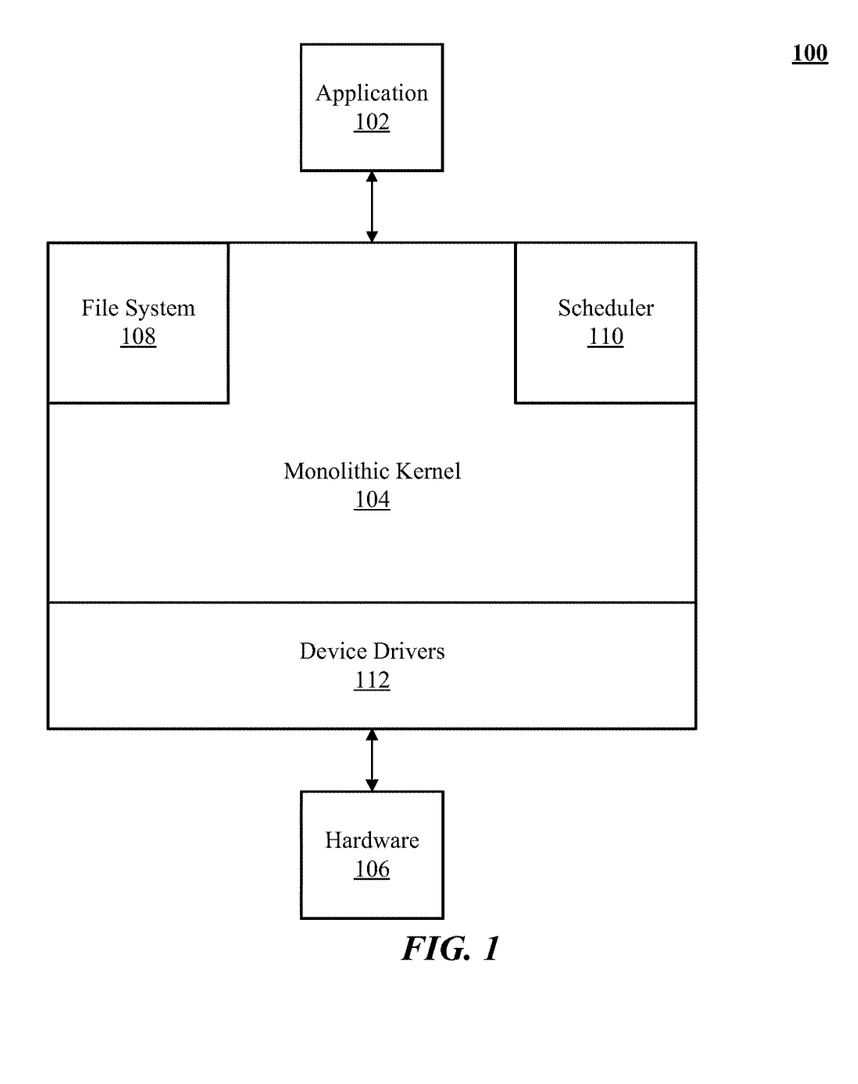
FIG. 1 illustrates an example operating system environment associated with a virtual reality system.

Referring to FIG. 1, an example operating system environment 100 is shown. In particular embodiments, the example operating system environment 100 may comprise a monolithic kernel architecture. The operating system environment 100 may comprise an application 102, a monolithic kernel 104, and hardware 106. In particular embodiments, the kernel 104 may comprise a plurality of different components 108, 110, 112. These different components 108, 110, 112 may include a file system 108, a scheduler 110, and device drivers 112 to interface the hardware 106. Although only three components 108, 110, 112 are shown, the kernel 104 may comprise more components. In particular embodiments, the application 102 may communicate directly with the kernel 104 with an operation request. As an example and not by way of limitation, after the kernel 104 determines the application 102 has permission for the operation request, the application 102 may be given access to the device drivers 112 to interface the hardware 106. This may provide the application 102 with a lot of access in certain contexts. As an example and not by way of limitation, if the application 102 were to compromise one or more of the components 108, 110, 112, then this would put other components 108, 110, 112 and the kernel 104 at risk. Furthermore, the application 102 may compromise the hardware 106 through the device drivers 112. In particular embodiments, the application 102 may be in the user space and the kernel 104 and its components 108, 110, 112 may be in kernel space.

Figure 2:
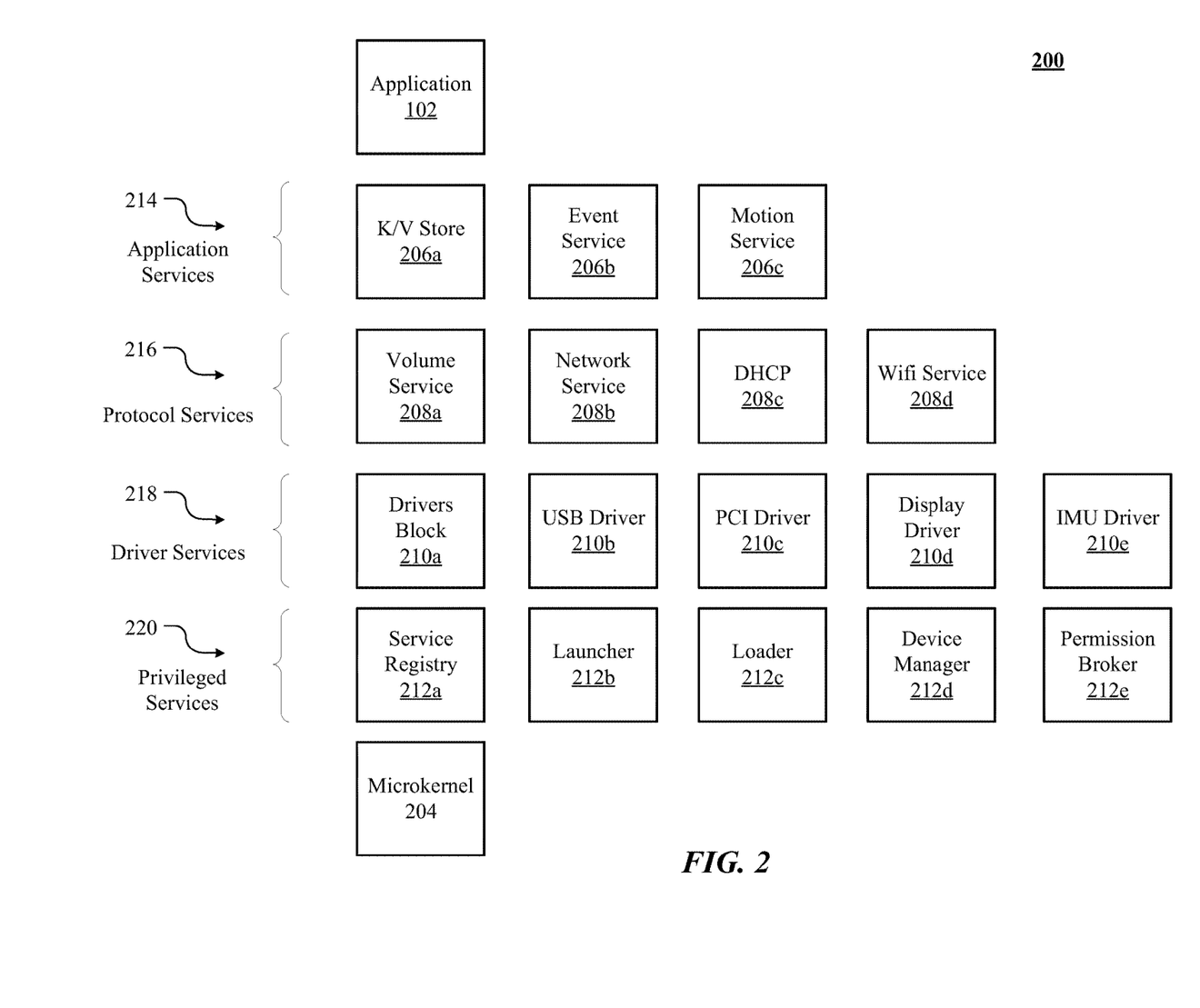
FIG. 2 illustrates another example operating system environment associated with a virtual reality system.

Referring to FIG. 2, another example operating system environment 200 is shown. The operating system environment may comprise an application 102, an application services layer 214, a protocol services layer 216, a driver services layer 218, a privileged services 220, and a micro-kernel 204. In particular embodiments, the services layers 214, 216, 218, 220 may include services 206, 208, 210, 212 in the user space and the microkernel 204 may be the only component of the operating system environment 200 in the kernel space. Typical microkernels may usually bundle same user-space processes, such as network service and driver, file system and volume service, etc. in order to reduce the inter-process communication between the separate processes because inter-process communication is expensive. However, the operating system environment 200 may separate out the services 206, 208, 210, 212 even further to improve upon security and reliability. The further separation is important because security and reliability may be more crucial than reducing the cost of inter-process communication between the separate processes in the microkernel 204. As such, the operating system environment 200 may separate each service 206, 208, 210, 212 into different processes. Although hardware is not shown in FIG. 2, the microkernel 204 may interface hardware to provide hardware resources to the application 102.

In particular embodiments, the application services layer 214 may include a K/V store 206a, an event service 206b, and a motion service 206c. In particular embodiments, the protocol services layer 216 may include a volume service 208a, a network service 208b, a dynamic host configuration protocol (DHCP) service 208c, and a wifi service 208d. In particular embodiments, the driver services layer 218 may include a drivers block 210a, a universal serial bus (USB) driver 210b, a peripheral component interconnect (PCI) driver 210c, a display driver 210d, and an inertial measurement unit (IMU) driver 210e. In particular embodiments, the privileged service layer 220 may include a service registry 212a, a launcher 212b, a loader 212c, a device manager 212d, and a permission broker 212e. Although each of the services layers 214, 216, 218, 220 are shown to include certain services 206, 208, 210, 212, the services layers 214, 216, 218, 220 may include additional services not shown. In particular embodiments, each service layer 214, 216, 218, 220 may be associated with various privilege levels. As an example and not by way of limitation, the privileged services layer 220 may be associated with a privilege level that is associated with a level of access to data and resources not accessible to the application services layer 214, protocol services layer 216, or the driver services layer 218. In particular embodiments, each of the services layers 214, 216, 218, 220 may have a level of access to data and resources that are only accessible to the respective layers 214, 216, 218, 220. In particular embodiments, the services 206, 208, 210, 212 may be grouped into their respective services layers 214, 216, 218, 220 based on a category of functions associated with the service. As an example and not by way of limitation the driver services layer 218 comprises services 210 related to drivers. In particular embodiments, the microkernel 204 may facilitate communication between the services 206, 208, 210, 212 through system calls to establish inter-process communication (IPC) channels. In particular embodiments, each of the services 206, 208, 210, 212 may be running on separate processes.

In particular embodiments, the services 206, 208, 210, 212 may only communicate with certain services 206, 208, 210, 212. As an example and not by way of limitation, a service 206 of the application services layer 214 may only send a system call to the microkernel 204 to request to communicate with a driver service 210 of the driver services layer 218. However, the application service 210 may be restricted in communicating with a privileged service 212 of the privileged services layer 220. In particular embodiments, there may be a mapping of which services 206, 208, 210, 212 a particular service may communicate with. As an example and not by way of limitation, a motion service 206c may communicate with an IMU driver 210e. This may enhance the security of the architecture by preventing unnecessary communications between the services 206, 208, 210, 212 if there are no instances of a service 206, 208, 210, 212 communicating with the service. In particular embodiments, the mapping of the services 206, 208, 210, 212 may be updated as necessary if there is a service that has a verified request. As an example and not by way of limitation, if the motion service 206e was not previously allowed to communicate with the IMU driver 210e, then the motion service 206e may send a request that may be verified by the microkernel 204. In particular embodiments, the verification may be done by a privileged service 212.

In particular embodiments, each privileged service 212 of the privileged services layer 220 may have a specific job within the operating system environment 200. In particular embodiments, the service registry 212a may provide a namespace for services 206, 208, 210, 212 and enforce permissions on service connections. The service registry 212a may map the services 206, 208, 210, 212 in order to identify which service 206, 208, 210, 212 is being requested when an application 102 is requesting to perform an operation. As an example and not by way of limitation, if the application 102 is requesting to take a picture, the application 102 may send a camera operation request (e.g., take a picture) to the service registry 212a. The service registry 212a may determine to send an instruction to a camera service to connect to the application 102. The determination may be based on the mapping where the service registry 212a identifies a service based on the received operation request. Additionally, the service registry 212a may enforce the permissions on whether the application 102 is permitted to access a particular service. If the service registry 212a determines the application 102 is not permitted to access the particular service, the service registry 212a may send back an error message. In particular embodiments, the application 102 may request permission to perform an operation from the user. As an example and not by way of limitation, the user may receive a notification of the application 102 requesting permission, which the user may grant and allow the application 102 access to a particular service to perform the requested operation. This may be a pop up on the screen of the user's device where the user grants permissions to the application 102. In particular embodiments, the launcher 212b may create a process and run a program. In particular embodiments, the loader 212c may load a program into memory. In particular embodiments, the device manager 212d may manage the list of drivers 210 of the driver services layer 218. In particular embodiments, the device manager 212d may enable or disable devices and/or add or remove services 210 of the driver services layer 218. In particular embodiments, the permission broker 212e may manage the permissions of each service. The permission broker 212e may add or remove permissions for any of the services.

Figure 3:
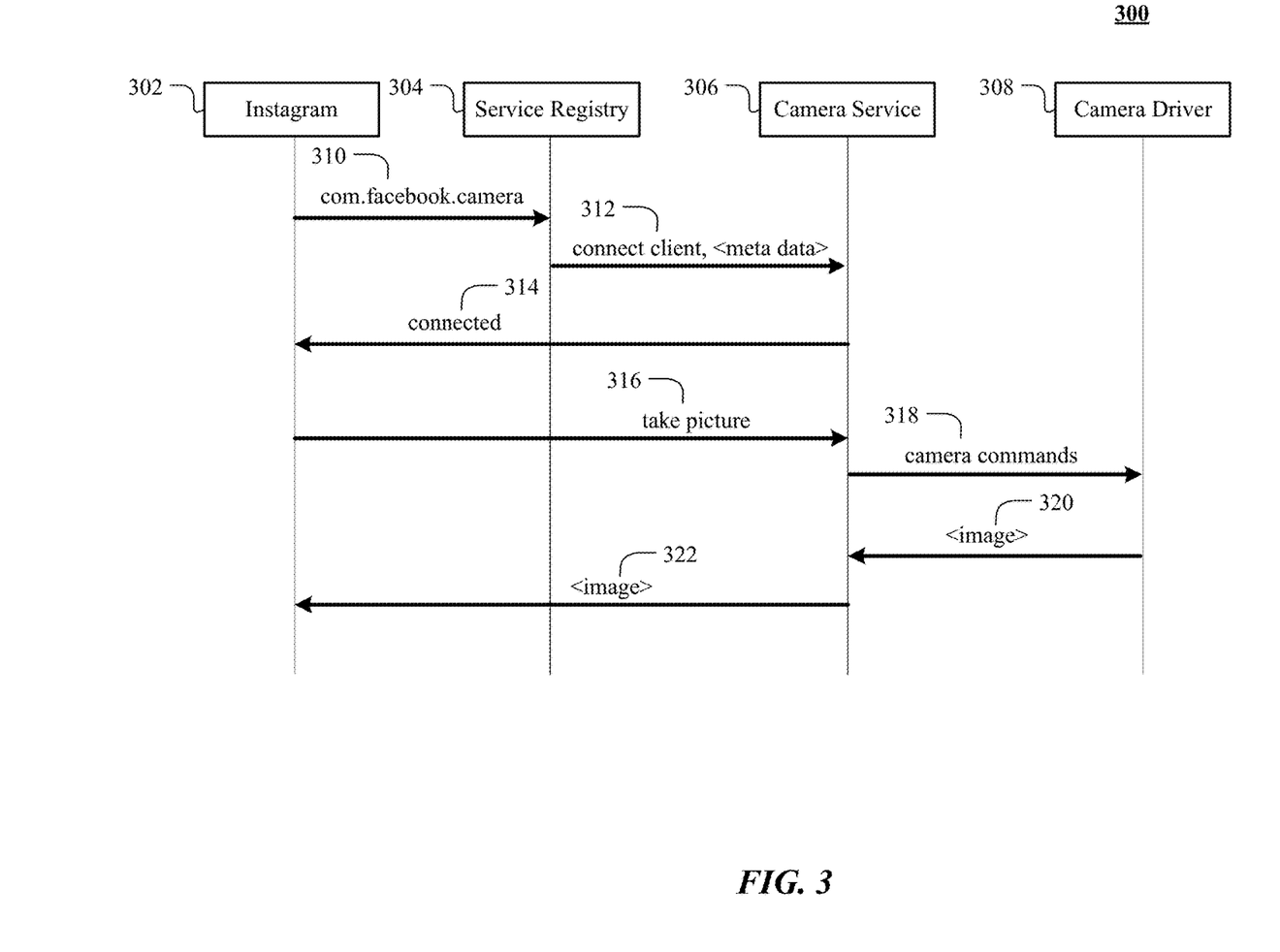
FIG. 3 illustrates an example diagram flow of a process of an application performing an operation.

Referring to FIG. 3, an example diagram flow of a process 300 of an application performing an operation is shown. In particular embodiments, the process 300 may comprise communication between an application 302 (e.g., Instagram), a service registry 304, a camera service 306, and a camera driver 308. Although the diagram flow illustrates certain components 302, 304, 306, 308 within the process 300, one or more components 302, 304, 306, 308 may be substituted for another component. As an example and not by way of limitation, the application 302 may be changed to another application (e.g., Facebook). As another example and not by way of limitation, the camera service 306 may be changed to a volume service. As another example and not by way of limitation, the camera driver 308 may be changed to a PCI driver.

In particular embodiments, the process 300 may start with the application 302 sending a first system call requesting to communicate with the service registry 304 to perform an operation. In particular embodiments, the application 302 may send the system call to a microkernel (not shown) to request a hardware resource to perform an operation, where the microkernel may help facilitate communication by sending the request from the application 302 to the service registry 304. The microkernel may facilitate communication between each of the components 302, 304, 306, 308 of the process 300. In particular embodiments, after the first system call is sent to the microkernel, an instruction 310 may be sent to the service registry 304. As an example and not by way of limitation, the instruction 310 may be a request to access a camera. As another example and not by way of limitation, the instruction 310 may be a request to access a network protocol service. In particular embodiments, the application 302 may identify a particular service it wants to access.

In particular embodiments, after the service registry 304 receives the instruction 310, the service registry 304 may map the request to a service, such as the camera service 306. The service registry 304 may identify the service that is associated with the requested hardware resource or operation that the application 302 is requesting to perform. In particular embodiments, after the service registry 304 determines the application 302 needs to access a particular service, the service registry 304 may send a system call to the microkernel to request to communicate with the particular service. The system call may be associated with the operation request from the application 302. As an example and not by way of limitation, the service registry 304 may determine the application 302 needs to access the camera service 306, and the service registry 304 may send a second system call to the microkernel to request to communicate with the camera service 306. As another example and not by way of limitation, the service registry 304 may determine the application 302 needs to access a network protocol service, and the service registry 304 may send a second system call to the microkernel to request to communicate with the network protocol service. In particular embodiments, the service registry 304 may determine whether the application 302 has permission to access a particular service. As an example and not by way of limitation, the service registry 304 may determine that the application 302 has permission to access the camera service 306. The service registry 304 may send the system call to the microkernel in response to determining the application 302 has permission to access the service. In particular embodiments, the service registry 304 may determine the application 302 wants to connect to a particular service, the service registry 304 may send a system call to the microkernel to establish a communication channel between the application 302 and the particular service. As an example and not by way of limitation, the microkernel may send the instruction 312 to the camera service 306 to connect to the application 302.

In particular embodiments, the camera service 306 may connect directly to the application 302 and send a message to the application 302 to notify that the camera service 306 has connected to the application 302. In particular embodiments, after the application 302 establishes connection with a particular service, the application 302 may send direct instructions to the service to perform an operation. As an example and not by way of limitation, the application 302 may send an instruction 316 to the camera service 306 to take a picture. As another example and not by way of limitation, if the application 302 was an online music streaming application, the application 302 may send an instruction to a volume service (that it was connected to) to change the volume.

In particular embodiments, a particular service may determine which service it needs to communicate to perform a requested operation. As an example and not by way of limitation, the camera service 306 may determine that it needs to communicate with the camera driver 308 in order to perform the requested operation from the application 302. That is, since the application 302 requested to take a picture in the instruction 316, the camera service 306 may determine in order to do so, the camera service 308 needs to communicate with the camera driver 308. In particular embodiments, a particular service may send a system call to the microkernel to request to communicate with a driver service. As an example and not by way of limitation, the camera service 306 may send a system call to the microkernel to request to communicate with the camera driver 308. The system call may be associated with the operation request. As an example and not by way of limitation, the system call may be associated with camera commands to take a picture. In particular embodiments, the microkernel may send an instruction 318 to the camera driver 308 comprising camera commands to take a picture.

In particular embodiments, a driver service may send back any data or response to the requesting service. As an example and not by way of limitation, the camera driver 308 may send back an image 320 to the camera service 306. In particular embodiments, the microkernel may send data or response to the requesting service. The microkernel may send back the image 320 to the camera service 306. In particular embodiments, a particular service may establish an IPC channel with another service through the microkernel. In particular embodiments, the service registry 304 may determine whether a particular service has permission to connect to another service. As an example and not by way of limitation, the service registry 304 may determine the camera service 306 has permission to connect to the camera driver 308 and establish an IPC channel. Then the two services may communicate directly. As an example and not by way of limitation, there may be an established IPC channel between the camera service 306 and the camera driver 308 where the camera driver 308 may send the image 320 directly to the camera service 306. In particular embodiments, the camera service 306 may send the image 320 received directly to the application 302. In particular embodiments, the camera service 306 may modify the image 320 and send a modified image 322. The camera service 306 may not need to modify the image 320 and send a same image 322.

Figure 4:
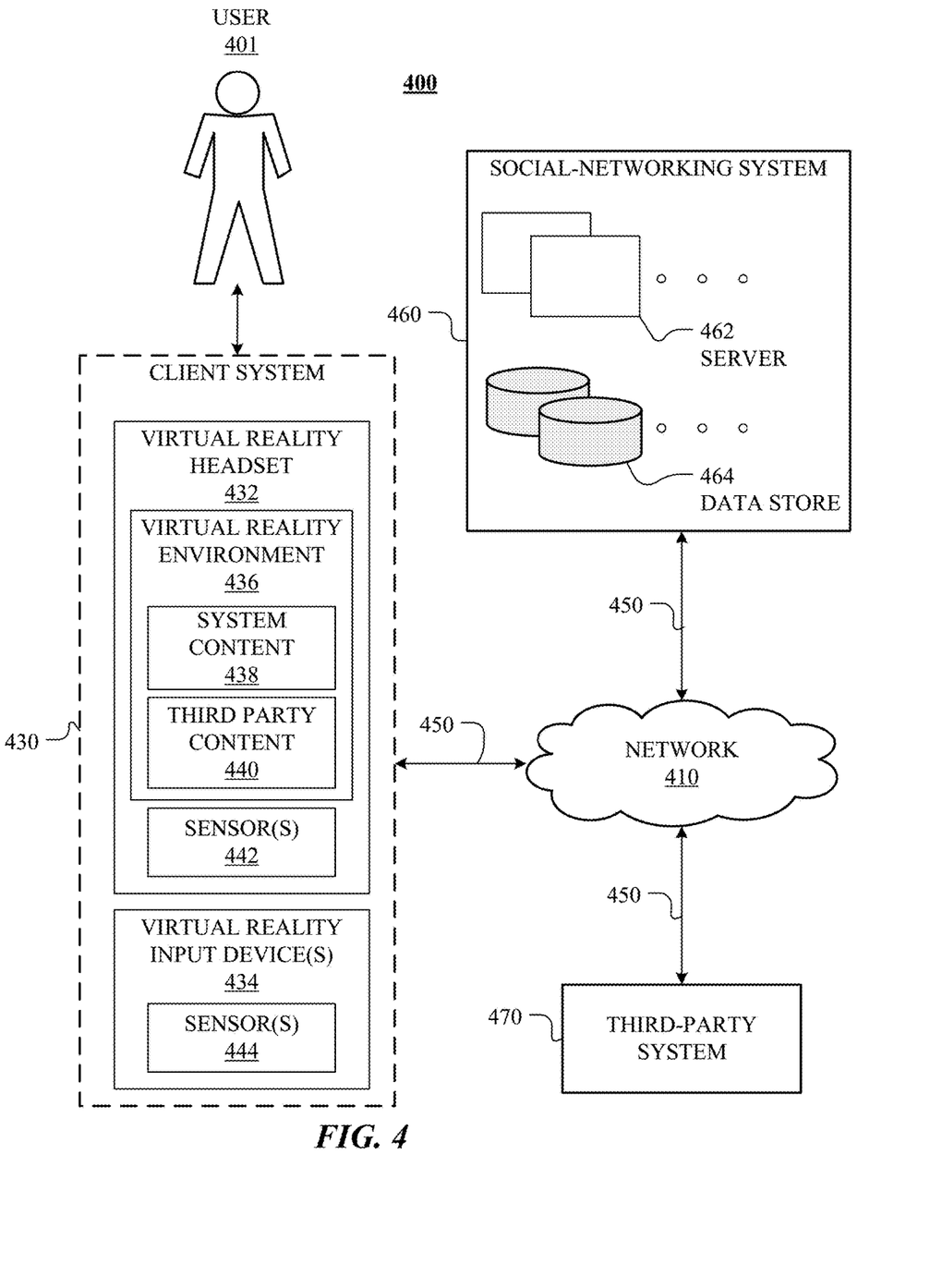
FIG. 4 illustrates an example network environment associated with a virtual reality system.

FIG. 4 illustrates an example network environment 400 associated with a virtual reality system. Network environment 400 includes a user 401 interacting with a client system 430, a social-networking system 460, and a third-party system 470 connected to each other by a network 410. Although FIG. 4 illustrates a particular arrangement of a user 401, a client system 430, a social-networking system 460, a third-party system 470, and a network 410, this disclosure contemplates any suitable arrangement of a user 401, a client system 430, a social-networking system 460, a third-party system 470, and a network 410. As an example and not by way of limitation, two or more of a user 401, a client system 430, a social-networking system 460, and a third-party system 470 may be connected to each other directly, bypassing a network 410. As another example, two or more of a client system 430, a social-networking system 460, and a third-party system 470 may be physically or logically co-located with each other in whole or in part. Moreover, although FIG. 4 illustrates a particular number of users 401, client systems 430, social-networking systems 460, third-party systems 470, and networks 410, this disclosure contemplates any suitable number of client systems 430, social-networking systems 460, third-party systems 470, and networks 410. As an example and not by way of limitation, network environment 400 may include multiple users 401, client systems 430, social-networking systems 460, third-party systems 470, and networks 410.

This disclosure contemplates any suitable network 410. As an example and not by way of limitation, one or more portions of a network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 410 may include one or more networks 410.

Links 450 may connect a client system 430, a social-networking system 460, and a third-party system 470 to a communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout a network environment 400. One or more first links 450 may differ in one or more respects from one or more second links 450.

In particular embodiments, a client system 430 may be an electronic device including hardware, software, or embedded logic components or a combination of two or more such components and capable of carrying out the appropriate functionalities implemented or supported by a client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 430. A client system 430 may enable a network user at a client system 430 to access a network 410. A client system 430 may enable its user to communicate with other users at other client systems 430. A client system 430 may generate a virtual reality environment for a user to interact with content.

In particular embodiments, a client system 430 may include a virtual reality (or augmented reality) headset 432, such as OCULUS RIFT and the like, and virtual reality input device(s) 434, such as a virtual reality controller. A user at a client system 430 may wear the virtual reality headset 432 and use the virtual reality input device(s) to interact with a virtual reality environment 436 generated by the virtual reality headset 432. Although not shown, a client system 430 may also include a separate processing computer and/or any other component of a virtual reality system. A virtual reality headset 432 may generate a virtual reality environment 436, which may include system content 438 (including but not limited to the operating system), such as software or firmware updates and also include third-party content 440, such as content from applications or dynamically downloaded from the Internet (e.g., web page content). A virtual reality headset 432 may include sensor(s) 442, such as accelerometers, gyroscopes, magnetometers to generate sensor data that tracks the location of the headset device 432. The headset 432 may also include eye trackers for tracking the position of the user's eyes or their viewing directions. The client system may use data from the sensor(s) 442 to determine velocity, orientation, and gravitation forces with respect to the headset. Virtual reality input device(s) 434 may include sensor(s) 444, such as accelerometers, gyroscopes, magnetometers, and touch sensors to generate sensor data that tracks the location of the input device 434 and the positions of the user's fingers. The client system 430 may make use of outside-in tracking, in which a tracking camera (not shown) is placed external to the virtual reality headset 432 and within the line of sight of the virtual reality headset 432. In outside-in tracking, the tracking camera may track the location of the virtual reality headset 432 (e.g., by tracking one or more infrared LED markers on the virtual reality headset 432). Alternatively or additionally, the client system 430 may make use of inside-out tracking, in which a tracking camera (not shown) may be placed on or within the virtual reality headset 432 itself. In inside-out tracking, the tracking camera may capture images around it in the real world and may use the changing perspectives of the real world to determine its own position in space.

Third-party content 440 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 430 may enter a Uniform Resource Locator (URL) or other address directing a web browser to a particular server (such as server 462, or a server associated with a third-party system 470), and the web browser may generate a Hyper Text Transfer Protocol (HTTP) request and communicate the HTTP request to server. The server may accept the HTTP request and communicate to a client system 430 one or more Hyper Text Markup Language (HTML) files responsive to the HTTP request. The client system 430 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 460 may be a network-addressable computing system that can host an online social network. The social-networking system 460 may generate, store, receive, and send social-networking data, such as, for example, user-profile data, concept-profile data, social-graph information, or other suitable data related to the online social network. The social-networking system 460 may be accessed by the other components of network environment 400 either directly or via a network 410. As an example and not by way of limitation, a client system 430 may access the social-networking system 460 using a web browser of a third-party content 440, or a native application associated with the social-networking system 460 (e.g., a mobile social-networking application, a messaging application, another suitable application, or any combination thereof) either directly or via a network 410. In particular embodiments, the social-networking system 460 may include one or more servers 462. Each server 462 may be a unitary server or a distributed server spanning multiple computers or multiple datacenters. Servers 462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 462 may include hardware, software, or embedded logic components or a combination of two or more such components for carrying out the appropriate functionalities implemented or supported by server 462. In particular embodiments, the social-networking system 460 may include one or more data stores 464. Data stores 464 may be used to store various types of information. In particular embodiments, the information stored in data stores 464 may be organized according to specific data structures. In particular embodiments, each data store 464 may be a relational, columnar, correlation, or other suitable database. Although this disclosure describes or illustrates particular types of databases, this disclosure contemplates any suitable types of databases. Particular embodiments may provide interfaces that enable a client system 430, a social-networking system 460, or a third-party system 470 to manage, retrieve, modify, add, or delete, the information stored in data store 464.

In particular embodiments, the social-networking system 460 may store one or more social graphs in one or more data stores 464. In particular embodiments, a social graph may include multiple nodes—which may include multiple user nodes (each corresponding to a particular user) or multiple concept nodes (each corresponding to a particular concept)—and multiple edges connecting the nodes. The social-networking system 460 may provide users of the online social network the ability to communicate and interact with other users. In particular embodiments, users may join the online social network via the social-networking system 460 and then add connections (e.g., relationships) to a number of other users of the social-networking system 460 whom they want to be connected to. Herein, the term "friend" may refer to any other user of the social-networking system 460 with whom a user has formed a connection, association, or relationship via the social-networking system 460.

In particular embodiments, the social-networking system 460 may provide users with the ability to take actions on various types of items or objects, supported by the social-networking system 460. As an example and not by way of limitation, the items and objects may include groups or social networks to which users of the social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 460 or by an external system of a third-party system 470, which is separate from the social-networking system 460 and coupled to the social-networking system 460 via a network 410.

In particular embodiments, the social-networking system 460 may be capable of linking a variety of entities. As an example and not by way of limitation, the social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating the social-networking system 460. In particular embodiments, however, the social-networking system 460 and third-party systems 470 may operate in conjunction with each other to provide social-networking services to users of the social-networking system 460 or third-party systems 470. In this sense, the social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 460 also includes user-generated content objects, which may enhance a user's interactions with the social-networking system 460. User-generated content may include anything a user can add, upload, send, or "post" to the social-networking system 460. As an example and not by way of limitation, a user communicates posts to the social-networking system 460 from a client system 430. Posts may include data such as status updates or other textual data, location information, photos, videos, links, music or other similar data or media. Content may also be added to the social-networking system 460 by a third-party through a "communication channel," such as a newsfeed or stream.

In particular embodiments, the social-networking system 460 may include a variety of servers, sub-systems, programs, modules, logs, and data stores. In particular embodiments, the social-networking system 460 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 460 may also include suitable components such as network interfaces, security mechanisms, load balancers, failover servers, management-and-network-operations consoles, other suitable components, or any suitable combination thereof. In particular embodiments, the social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 460 to one or more client systems 430 or one or more third-party systems 470 via a network 410. The web server may include a mail server or other messaging functionality for receiving and routing messages between the social-networking system 460 and one or more client systems 430. An API-request server may allow a third-party system 470 to access information from the social-networking system 460 by calling one or more APIs. An action logger may be used to receive communications from a web server about a user's actions on or off the social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from a client system 430 responsive to a request received from a client system 430. Authorization servers may be used to enforce one or more privacy settings of the users of the social-networking system 460. A privacy setting of a user determines how particular information associated with a user can be shared. The authorization server may allow users to opt in to or opt out of having their actions logged by the social-networking system 460 or shared with other systems (e.g., a third-party system 470), such as, for example, by setting appropriate privacy settings. Third-party-content-object stores may be used to store content objects received from third parties, such as a third-party system 470. Location stores may be used for storing location information received from client systems 430 associated with users. Advertisement-pricing modules may combine social information, the current time, location information, or other suitable information to provide relevant advertisements, in the form of notifications, to a user.

Figure 5:
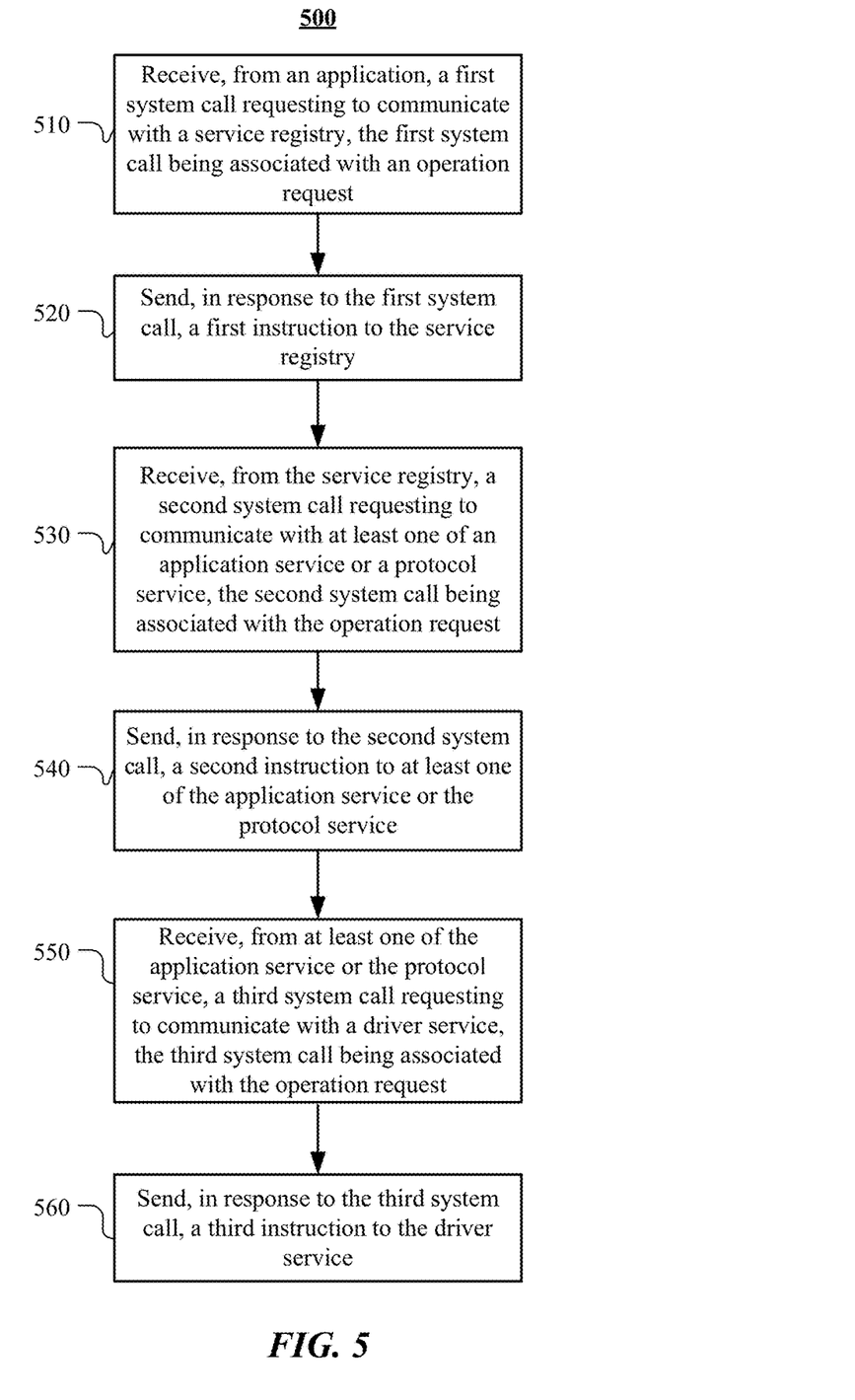
FIG. 5 illustrates an example method for an application to perform an operation.

FIG. 5 illustrates an example method 500 for an application to perform an operation. The method may begin at step 510, where a microkernel of an operating system executing on a computing system (e.g., augmented reality system or virtual reality system) may receive, from an application, a first system call requesting to communicate with a service registry. In particular embodiments, the first system call may be associated with an operation request. At step 520, the microkernel may send, in response to the first system call, a first instruction to the service registry. At step 530, the microkernel may receive, from the service registry, a second system call requesting to communicate with at least one of an application service or a protocol service. In particular embodiments, the second system call may be associated with the operation request. At step 540, the microkernel may send, in response to the second system call, a second instruction to at least one of the application service or the protocol service. At step 550, the microkernel may receive, from at least one of the application service or the protocol service, a third system call requesting to communicate with a driver service. In particular embodiments, the third system call may be associated with the operation request. At step 560, the microkernel may send, in response to the third system call, a third instruction to the driver service. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for handling a system call from a process, including the particular steps of the method of FIG. 5, this disclosure contemplates any suitable method of handling a system call from a process, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
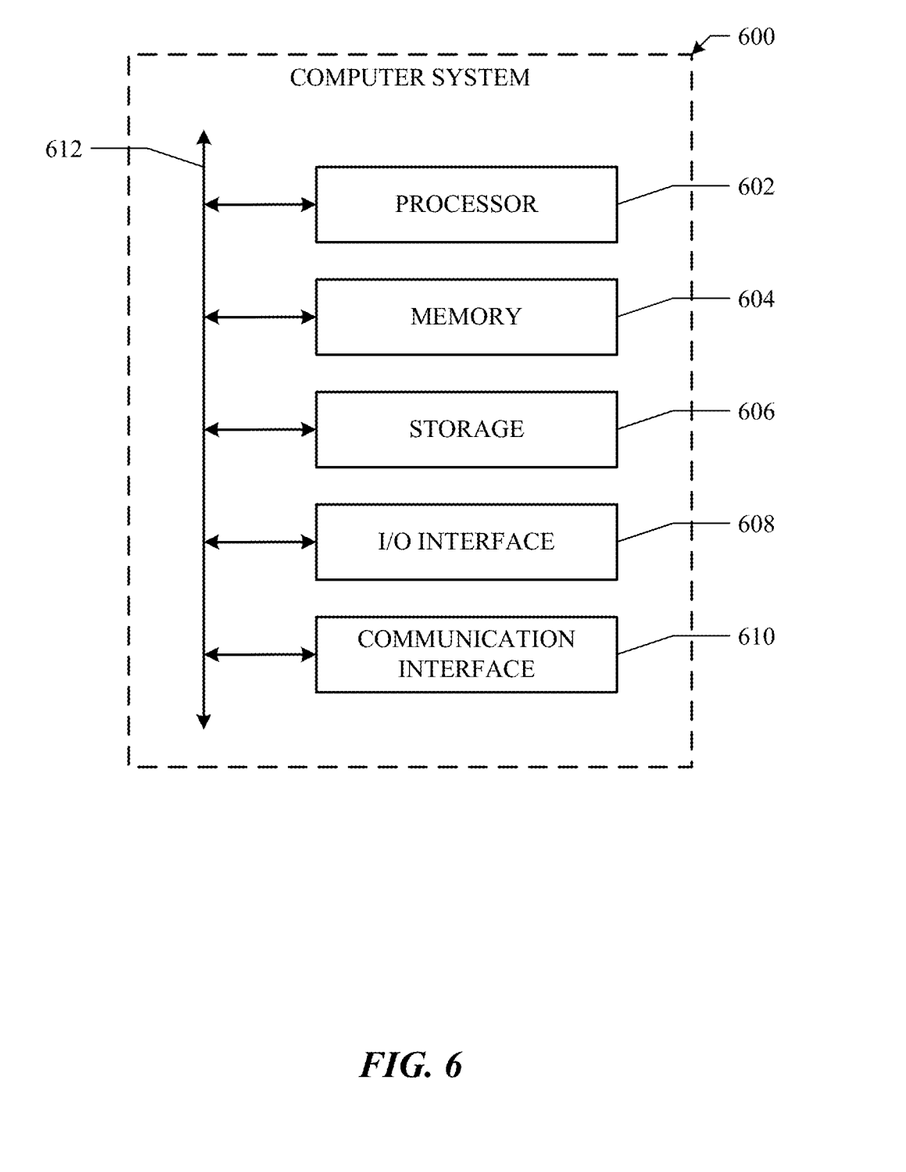
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, by a microkernel executing on a computing system, comprising:
   receiving, by the microkernel from an application, a first system call requesting to communicate with a service registry, the first system call being associated with an operation request, wherein the service registry is located in a user space separate from a kernel space, and wherein the microkernel is located in the kernel space separate from the user space;
   sending, by the microkernel in response to the first system call, a first instruction to the service registry;
   receiving, by the microkernel from the service registry in response to sending the first instruction to the service registry, a second system call requesting to communicate with at least one of an application service or a protocol service, the second system call being associated with the operation request, wherein the application service and the protocol service are both located in the user space;
   sending, by the microkernel in response to the second system call, a second instruction to at least one of the application service or the protocol service;
   receiving, by the microkernel from at least one of the application service or the protocol service in response to sending the second instruction to the at least one of the application service or the protocol service, a third system call requesting to communicate with a driver service, the third system call being associated with the operation request, wherein the driver service is located in the user space; and
   sending, by the microkernel in response to the third system call, a third instruction to the driver service.

2. The method of claim 1, wherein the operation request is a request for a hardware resource to perform an operation.

3. The method of claim 1, wherein the service registry determines whether the application has permission to access at least one of the application service or the protocol service, and wherein the service registry sends the second system call in response to determining the application has permission to access at least one of the application service or the protocol service.

4. The method of claim 3, wherein the operation request is associated with an operation to be performed, and wherein the application identifies the application service or the protocol service to send the second instruction based on the operation to be performed.

5. The method of claim 3, further comprising:
   receiving, from the service registry in response to the service registry determining the application has permission to access at least one of the application service or the protocol service, a fourth system call to establish a connection between at least one of the application service or the protocol service to the application.

6. The method of claim 1, wherein the application service comprises one of a key-value store, a motion service or an event service.

7. The method of claim 1, wherein the protocol service comprises one of a volume service, a network service, a dynamic host configuration protocol, or a wifi service.

8. The method of claim 1, wherein the third system call identifies the driver service of a plurality of driver services to send the third instruction.

9. The method of claim 8, wherein the application service or the protocol service identifies the driver service to send the third instruction based on the second instruction, wherein the first instruction is associated with an operation to be performed by the driver service.

10. The method of claim 1, wherein the driver service comprises one of a drivers block, a driver for a universal serial bus (USB), a driver for a peripheral component interconnect (PCI), a driver for a display, or a driver for an inertial measurement unit (IMU).

11. The method of claim 1, wherein the service registry is one of a plurality of privileged services, and wherein the plurality of privileged services further comprises one of, a launcher, a loader, a device manager, or a permission broker.

12. The method of claim 11, wherein each of the application service or the protocol service, the driver service, and the privileged service are running on separate processes.

13. The method of claim 11, wherein the privileged service is associated with a first privilege level, wherein the first privilege level is associated with a first level of access to data and resources not accessible to the application service, protocol service, or the driver service.

14. The method of claim 11, wherein the application service or the protocol service has permission to establish inter-process communication (IPC) calls with the driver service, and wherein the driver service has permission to establish IPC calls with the privileged service.

15. The method of claim 1, further comprising:
   receiving a first response to the third instruction from the driver service, wherein the first response is associated with the operation request; and
   sending the first response to the application service or the protocol service.

16. The method of claim 15, further comprising:
   receiving a second response to the second instruction from the application service or the protocol service, wherein the second response is associated with the operation request; and
   sending the second response to the application.

17. One or more computer-readable non-transitory storage media embodying software that is operable when executed to:

receive, by a microkernel from an application, a first system call requesting to communicate with a service registry, the first system call being associated with an operation request, wherein the service registry is located in a user space separate from a kernel space, and wherein the microkernel is located in the kernel space separate from the user space;

send, by the microkernel in response to the first system call, a first instruction to the service registry;

receive, by the microkernel from the service registry in response to sending the first instruction to the service registry, a second system call requesting to communicate with at least one of an application service or a protocol service, the second system call being associated with the operation request, wherein the application service and the protocol service are both located in the user space;

send, by the microkernel in response to the second system call, a second instruction to at least one of the application service or the protocol service;

receive, by the microkernel from at least one of the application service or the protocol service in response to sending the second instruction to the at least one of the application service or the protocol service, a third system call requesting to communicate with a driver service, the third system call being associated with the operation request, wherein the driver service is located in the user space; and send, by the microkernel in response to the third system call, a third instruction to the driver service.

18. A system comprising: one or more processors; and a non-transitory memory coupled to the processors comprising instructions executable by the processors, the processors operable when executing the instructions to:

receive, by a microkernel from an application, a first system call requesting to communicate with a service registry, the first system call being associated with an operation request, wherein the service registry is located in a user space separate from a kernel space, and wherein the microkernel is located in the kernel space separate from the user space;

send, by the microkernel in response to the first system call, a first instruction to the service registry;

receive, by the microkernel from the service registry in response to sending the first instruction to the service registry, a second system call requesting to communicate with at least one of an application service or a protocol service, the second system call being associated with the operation request, wherein the application service and the protocol service are both located in the user space;

send, by the microkernel in response to the second system call, a second instruction to at least one of the application service or the protocol service;

receive, by the microkernel from at least one of the application service or the protocol service in response to sending the second instruction to the at least one of the application service or the protocol service, a third system call requesting to communicate with a driver service, the third system call being associated with the operation request, wherein the driver service is located in the user space; and send, by the microkernel in response to the third system call, a third instruction to the driver service.

\* \* \* \* \*